(12) United States Patent
Groom

(10) Patent No.: US 9,701,194 B2
(45) Date of Patent: Jul. 11, 2017

(54) FUEL-DISPENSING NOZZLE INHIBITOR

(71) Applicant: Stant USA Corp., Connersville, IN (US)

(72) Inventor: J Bradley Groom, Oxford, OH (US)

(73) Assignee: Stant USA Corp., Connersville, IN (US)

( * ) Notice: Subject to any disclaimer, the term of this patent is extended or adjusted under 35 U.S.C. 154(b) by 320 days.

(21) Appl. No.: 14/275,668

(22) Filed: May 12, 2014

(65) Prior Publication Data
US 2014/0332530 A1  Nov. 13, 2014

Related U.S. Application Data

(60) Provisional application No. 61/822,243, filed on May 10, 2013, provisional application No. 61/937,730, filed on Feb. 10, 2014.

(51) Int. Cl.
*B60K 15/04* (2006.01)

(52) U.S. Cl.
CPC ...... *B60K 15/04* (2013.01); *B60K 2015/0461* (2013.01); *B60K 2015/0483* (2013.01)

(58) Field of Classification Search
CPC ............ B60K 15/04; B60K 2015/0461; B60K 2015/0483
USPC ................. 141/350, 349, 348, 346; 220/86.2
See application file for complete search history.

(56) References Cited

U.S. PATENT DOCUMENTS

| | | | | |
|---|---|---|---|---|
| 2,145,758 A | * | 1/1939 | Fellows | B60K 15/0406 220/822 |
| 2,206,948 A | * | 7/1940 | Frankford | B60K 15/04 220/86.2 |
| 3,481,506 A | * | 12/1969 | Vevirit | A24F 19/08 131/242 |
| 6,382,270 B1 | | 5/2002 | Gzik | |
| 6,539,990 B1 | | 4/2003 | Levey et al. | |
| 6,871,677 B2 | | 3/2005 | Zerangue | |

(Continued)

FOREIGN PATENT DOCUMENTS

| | | |
|---|---|---|
| EP | 1262356 A1 | 12/2002 |
| EP | 1284212 A1 | 2/2003 |

(Continued)

OTHER PUBLICATIONS

International Preliminary Report on Patentability and Written Opinion issued on Nov. 10, 2015 in connection with PCT/US2014/037716, 12 pages.

(Continued)

*Primary Examiner* — Allana Bidder
*Assistant Examiner* — James Hakomaki
(74) *Attorney, Agent, or Firm* — Barnes & Thornburg LLP

(57) ABSTRACT

A nozzle inhibitor is adapted to be arranged in a filler neck included in a fuel-tank fill tube and is configured to allow only a diesel fuel nozzle having an outer diameter that is greater than a specified minimum diameter to be inserted into the fill tube to a depth sufficient so that a user may dispense diesel fuel from that nozzle into the fill tube. The nozzle inhibitor inhibits insertion of a small-diameter unleaded fuel nozzle into the fill tube, yet allows insertion of a relatively larger diameter diesel fuel nozzle into the fill tube so that only diesel fuel is dispensed into a diesel fuel tank coupled to the fill tube.

26 Claims, 10 Drawing Sheets

(56) References Cited

U.S. PATENT DOCUMENTS

| | | | |
|---|---|---|---|
| 6,923,224 B1 | 8/2005 | McClung et al. | |
| 6,983,773 B1 | 1/2006 | Hagano et al. | |
| 7,011,121 B2 | 3/2006 | Bar et al. | |
| 7,077,178 B2 | 7/2006 | Hedevang | |
| 7,163,037 B2 * | 1/2007 | Walkowski | B60K 15/0406 141/350 |
| 7,182,111 B2 | 2/2007 | McClung et al. | |
| 7,293,586 B2 | 11/2007 | Groom et al. | |
| 7,302,977 B2 | 12/2007 | King et al. | |
| 7,461,673 B2 * | 12/2008 | Busch | B60K 15/0406 141/348 |
| 7,621,303 B2 | 11/2009 | Buchgraber | |
| 7,661,550 B2 * | 2/2010 | Feichtinger | B60K 15/04 137/588 |
| 7,665,493 B2 | 2/2010 | Groom et al. | |
| 7,789,113 B2 | 9/2010 | Stephan et al. | |
| 7,950,425 B2 | 5/2011 | Och | |
| 7,967,041 B2 | 6/2011 | Groom et al. | |
| 7,967,042 B2 | 6/2011 | Groom et al. | |
| 8,191,588 B2 | 6/2012 | Hagano | |
| 8,726,950 B2 | 5/2014 | Miller et al. | |
| 2006/0289084 A1 | 12/2006 | Groom et al. | |
| 2007/0000571 A1 | 1/2007 | Jones et al. | |
| 2008/0087354 A1 | 4/2008 | Cisternino et al. | |
| 2008/0178962 A1 | 7/2008 | Baudoux et al. | |
| 2009/0020182 A1 | 1/2009 | Groom et al. | |
| 2009/0095373 A1 | 4/2009 | Correira et al. | |
| 2010/0006178 A1 | 1/2010 | Muth et al. | |
| 2010/0132838 A1 | 6/2010 | Cisternino et al. | |
| 2010/0212780 A1 * | 8/2010 | Sato | B60K 15/04 141/350 |
| 2010/0218849 A1 | 9/2010 | Hagano | |
| 2011/0017349 A1 | 1/2011 | Cartwright | |
| 2011/0139779 A1 | 6/2011 | Muller | |
| 2011/0214783 A1 * | 9/2011 | Ichimaru | B60K 15/04 141/381 |
| 2012/0211489 A1 | 8/2012 | Walser et al. | |
| 2012/0279612 A1 | 11/2012 | Washio et al. | |

FOREIGN PATENT DOCUMENTS

| | | |
|---|---|---|
| EP | 1712398 A1 | 10/2006 |
| JP | 2007261492 A | 10/2007 |
| JP | 2009096215 A | 5/2009 |
| WO | 2010026502 A1 | 3/2010 |

OTHER PUBLICATIONS

International Search Report and Written Opinion, International Application No. PCT/US14/37716, Sep. 9, 2014, 13 pages.

* cited by examiner

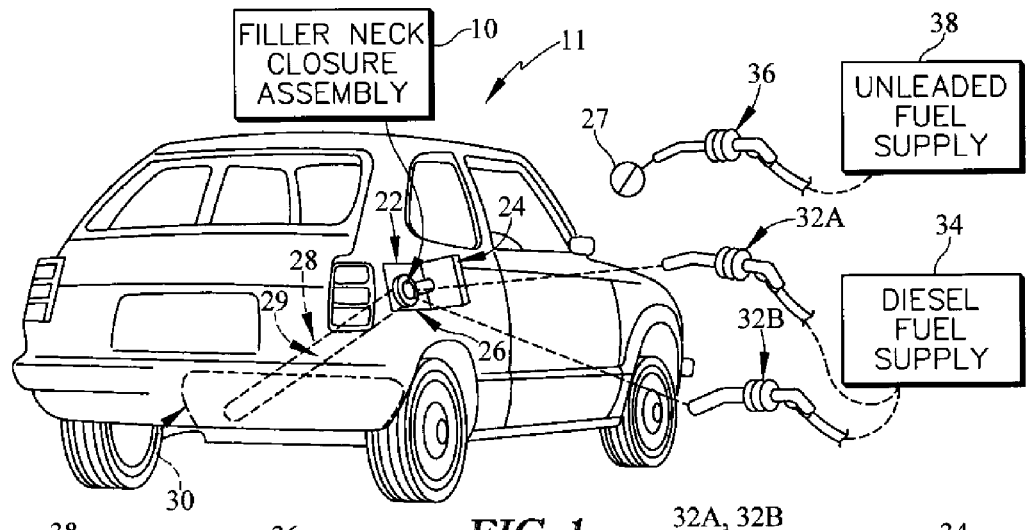
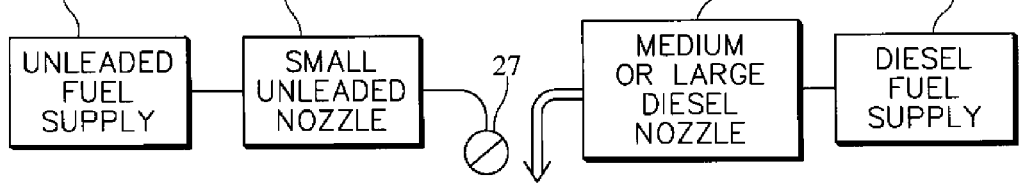
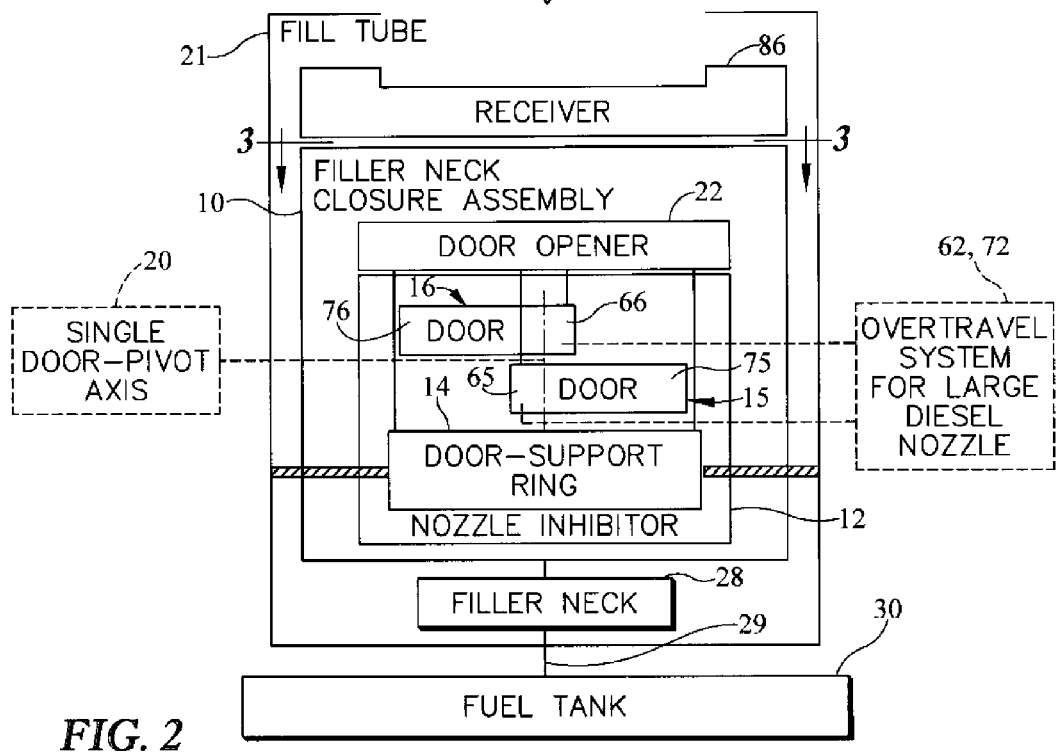

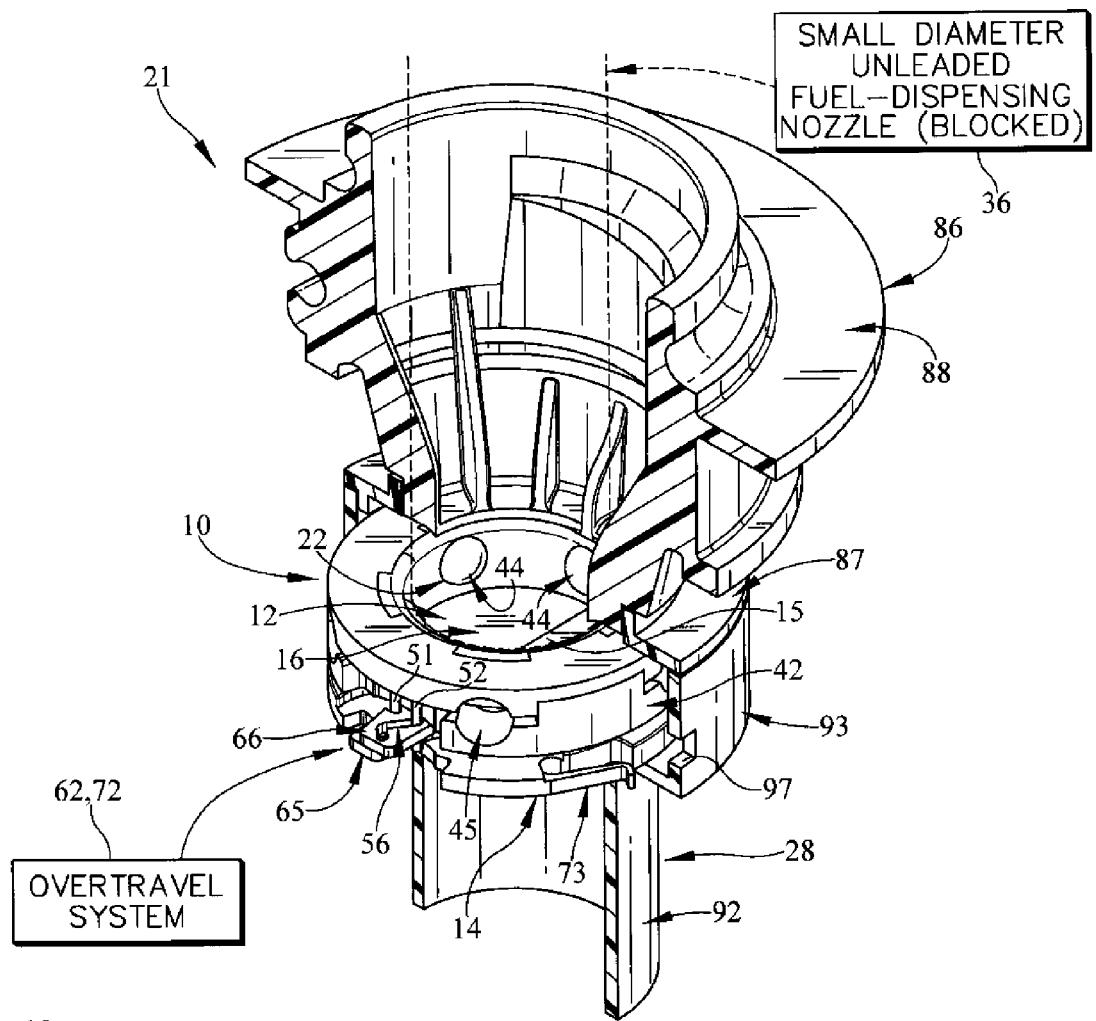
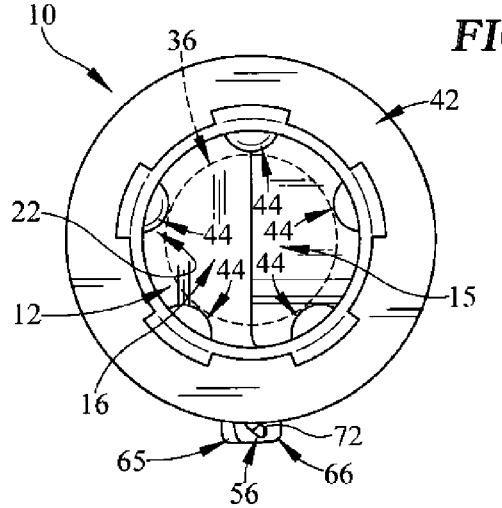
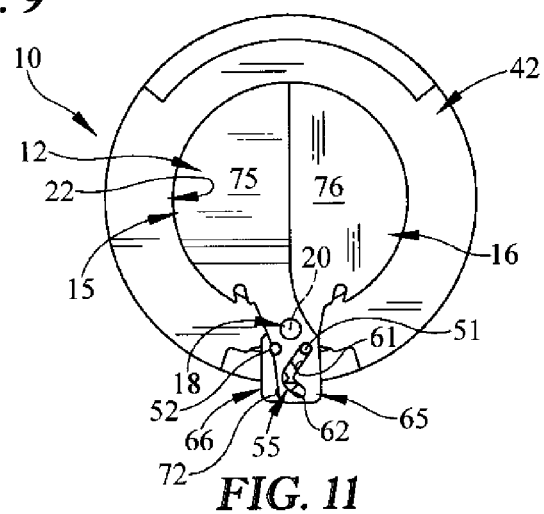
FIG. 9
FIG. 10     FIG. 11

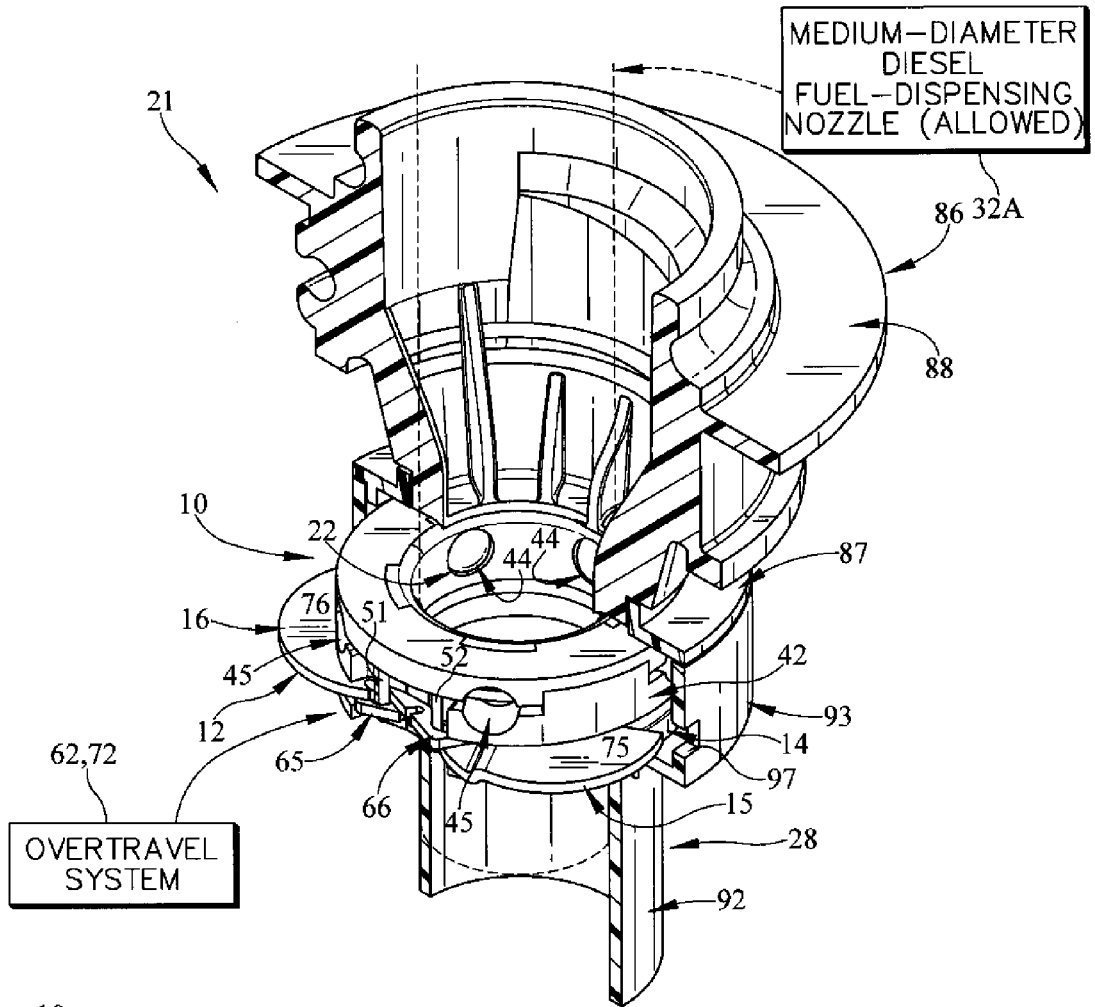
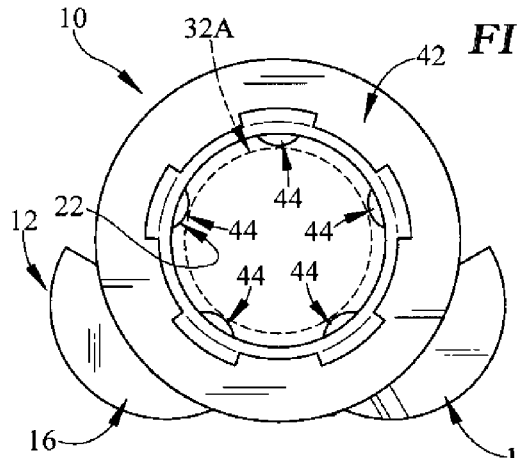
FIG. 13
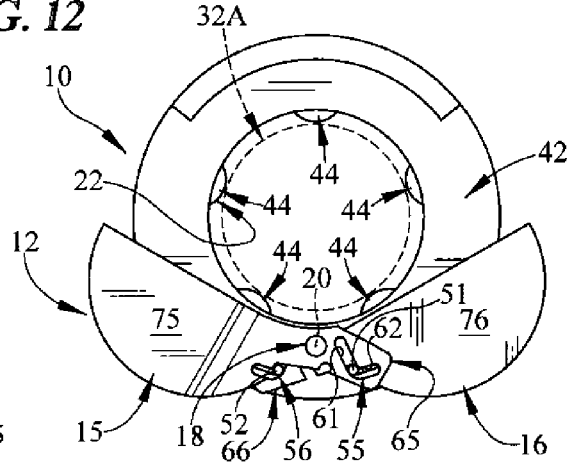
FIG. 14

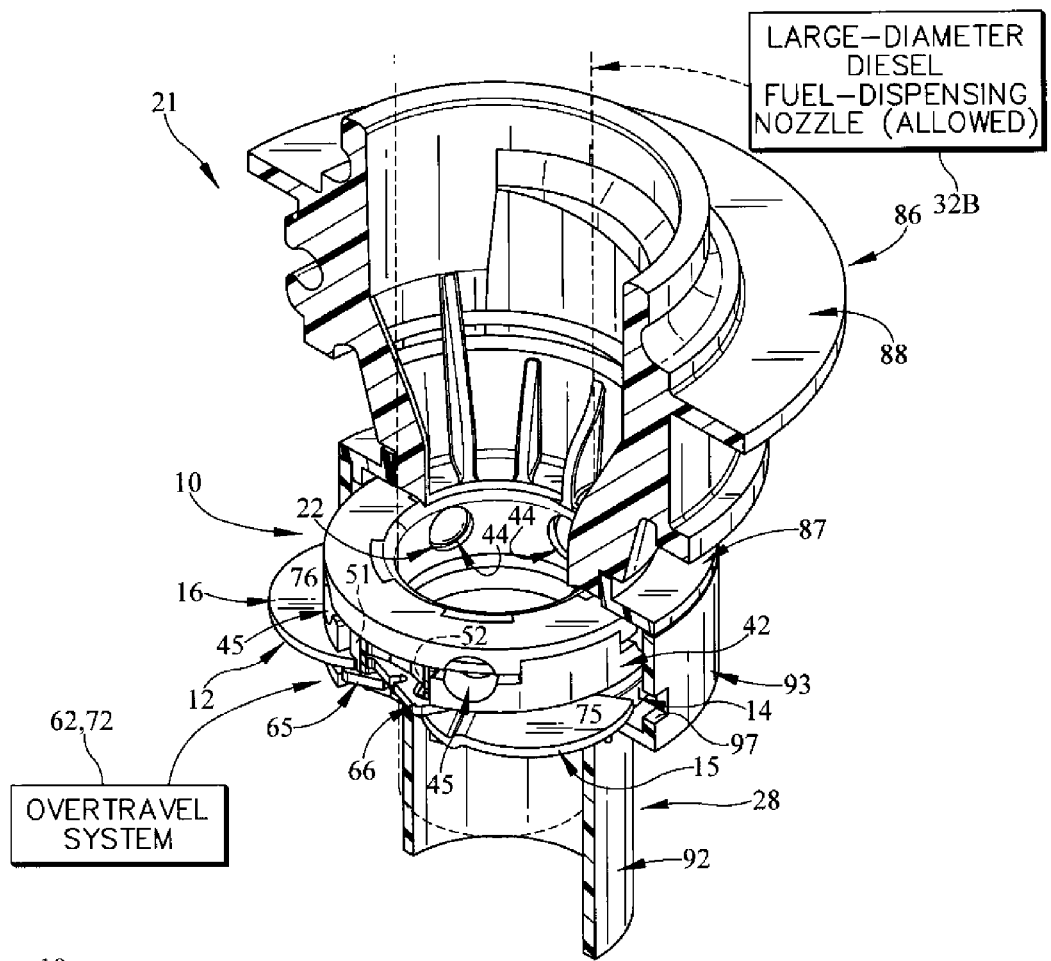
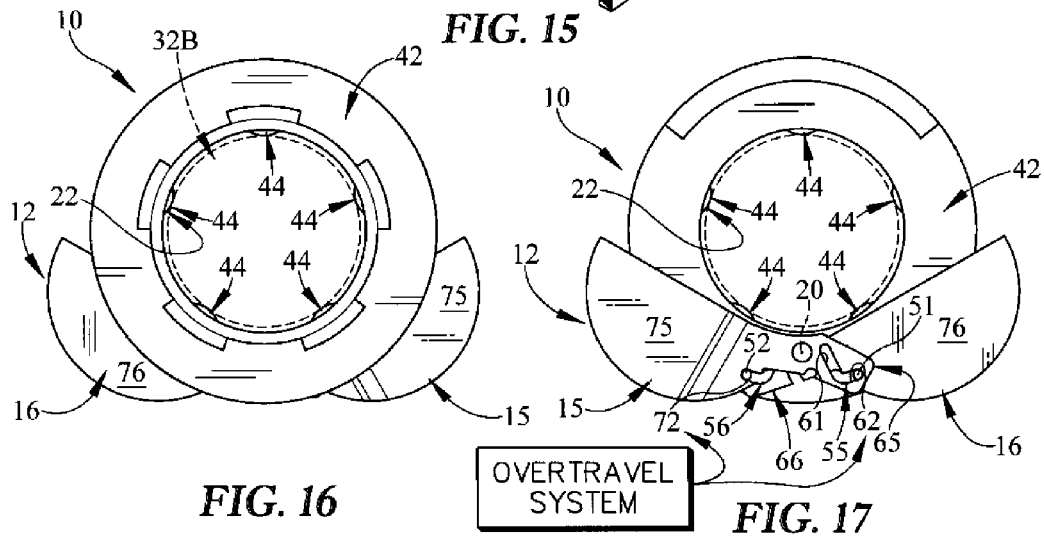
FIG. 15
FIG. 16
FIG. 17

US 9,701,194 B2

FUEL-DISPENSING NOZZLE INHIBITOR

PRIORITY CLAIM

This application claims priority under 35 U.S.C. §119(e) to U.S. Provisional Application Ser. No. 61/822,243, filed May 10, 2013, and U.S. Provisional Application Ser. No. 61/937,730, filed Feb. 10, 2014, which are both expressly incorporated by reference herein.

BACKGROUND

The present disclosure relates to a fuel tank fill tube, and more particularly to a device for preventing the introduction of a nozzle for unleaded fuel into the fill tube of a fuel tank of a motor vehicle fitted with a diesel internal combustion engine.

Unleaded fuel should not be introduced into a fill tube of a consumer motor vehicle powered by a diesel engine. It is customary to use a small-diameter fuel-dispensing nozzle (e.g., 21.5 mm or less) to dispense unleaded fuel into a fuel tank fill tube and to use a medium-diameter fuel-dispensing nozzle (e.g., 23.6 mm) or a large-diameter fuel-dispensing nozzle (e.g., 25.5 mm) to dispense diesel and leaded fuel into a fuel tank fill tube.

SUMMARY

A fuel tank fill tube includes a filler neck and a filler neck closure assembly adapted to allow only a diesel fuel nozzle having an outer diameter that is greater than a specified minimum diameter to be inserted into the filler neck to a depth sufficient so that a user may dispense diesel fuel from that nozzle into a diesel fuel tank coupled to the fill tube. Such a closure assembly inhibits insertion of a small-diameter unleaded fuel nozzle into the filler neck of a diesel fuel tank, yet allows a medium-diameter or large-diameter diesel fuel nozzle to be inserted into the filler neck of the diesel fuel tank.

In illustrative embodiments, the closure assembly includes a nozzle inhibitor that blocks or allows fuel-dispensing nozzles to be inserted into the filler neck past the nozzle inhibitor. The nozzle inhibitor includes a door support forming an opening, a first door coupled to the door support, and a second door coupled to the door support. The door support is ring-shaped in an illustrative embodiment. The first and the second door are each mounted on the door-support ring for rotation about a door-pivot axis for movement relative to one another between closed positions blocking passage of the fuel-dispensing nozzle past the nozzle inhibitor and into the filler neck and opened positions allowing passage of the fuel-dispensing nozzle past the nozzle inhibitor and into the filler neck. A single door-pivot axis is provided for the first and second doors in illustrative embodiments.

In illustrative embodiments, a door opener is coupled to each of the first and the second doors and configured to cause rotation of the first and the second doors relative to one another about the single door-pivot axis so that the doors included in the nozzle inhibitor are pivoted to assume the same opened position when a medium-diameter or a large-diameter (diesel) fuel-dispensing nozzle is inserted into the filler neck closure assembly to engage the door opener. The door opener includes a flexible band and a plurality of band movers. The flexible band has a first end coupled to the first door and a second end coupled to the second door. The plurality of band movers engage the flexible band to expand the flexible band temporarily in the radial direction when a medium-diameter or large-diameter (diesel) fuel-dispensing nozzle is inserted into the filler neck closure assembly to engage and move the band movers.

In illustrative embodiments, each of the first and the second doors include a closure panel that is movable about the door-pivot axis either to block or allow access to the filler neck and an outer tab that couples the closure panel to the door-support ring. The outer tab of the first door is formed to include an L-shaped slot that receives a first end of the flexible band and that is defined by a first leg providing a regular end-travel segment and a second leg providing an end-overtravel segment so that the first door can be pivoted to the same opened position by medium-diameter (diesel) fuel-dispensing nozzles and large-diameter (diesel) fuel-dispensing nozzles. Similarly, the outer tab of the second door is formed to include an L-shaped slot that receives a second end of the flexible band and that is defined by a first leg providing a regular end-travel segment and a second leg providing an end-overtravel segment so that the second door can be pivoted to the same opened position by medium-diameter (diesel) fuel-dispensing nozzle and large-diameter (diesel) fuel-dispensing nozzles.

In illustrative embodiments, during temporary expansion of the flexible band due to a medium-diameter or a large-diameter (diesel) fuel-dispensing nozzle being inserted into the filler neck closure assembly, the ends of the flexible band slide along a first leg of each of the L-shaped slots formed in the first and the second doors. Sliding the ends of the flexible band along the first leg of each of the L-shaped slots formed in the first and the second doors causes the first and the second doors to pivot in opposite directions about the door-pivot axis, thereby moving the first and second doors included in the nozzle inhibitor to the opened positions.

In illustrative embodiments, during temporary expansion of the flexible band due to a large-diameter (diesel) fuel-dispensing nozzle being inserted into the filler neck closure assembly and moved to engage the door opener, the ends of the flexible band slide along both first and second legs of each of the L-shaped slots formed in the first and the second doors. Sliding the ends of the flexible band along the first leg of each of the L-shaped slots formed in the first and the second doors causes the first and the second doors to pivot in opposite directions about the door-pivot axis, thereby moving the doors included in the nozzle inhibitor to the opened position. Sliding the ends of the flexible band along the second (i.e., overtravel) leg of each of the L-shaped slots formed in the first and the second doors establishes a lost-motion driving connection between the flexible band and the doors to allow the doors to remain in that opened position without causing any additional pivoting of the first and the second doors away from one another in a way that might otherwise damage components included in the filler neck closure assembly using an overtravel system in accordance with the present disclosure. Space is also conserved in the filler neck closure assembly because opening the doors using a large-diameter (diesel) fuel-dispensing nozzle does not cause the doors to move to a relatively wider opened position as compared to the opened position of the doors that is established using a medium-diameter (diesel) fuel-dispensing nozzle. Providing for lost motion of the flexible band relative to the first and the second doors using an overtravel system in accordance with the present disclosure allows for radial movement of the band movers to accommodate the relatively larger large-diameter fuel-dispensing nozzle without increasing size of the filler neck closure assembly to accommodate additional movement of the first and the second doors due to the large-diameter (diesel) fuel-dispensing nozzle.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 1 is a perspective view of a diesel-engine vehicle provided with a fuel-tank fill tube showing an outer filler-neck access door moved to an opened position relative to a vehicle body panel to expose a filler neck closure assembly made in accordance with the present disclosure and coupled to a filler neck (shown in phantom) leading to a vehicle fuel tank (also shown in phantom), showing a medium-diameter and a large-diameter (diesel) fuel-dispensing nozzle coupled to a diesel fuel supply and sized to be inserted into the filler neck closure assembly during vehicle refueling to discharge liquid diesel fuel into the filler neck leading to the vehicle fuel tank, and showing a small-diameter (unleaded) fuel-dispensing pump nozzle coupled to an unleaded fuel supply that is not authorized for use to refuel the diesel-engine vehicle fuel tank;

FIG. 2 is a diagrammatic view of a filler neck closure assembly in accordance with the present disclosure showing that the filler neck closure assembly comprises a nozzle inhibitor including first and second doors mounted for pivotable movement about a single door-pivot axis that extends along the filler neck, and suggesting that the nozzle inhibitor is configured to provide inhibitor means for preventing insertion of a small-diameter (unleaded) fuel-dispensing nozzle into a fuel-conducting passageway formed in a filler neck included in the fuel-tank fill tube and coupled to a vehicle fuel tank while allowing insertion of a medium-diameter or (an oversized) large-diameter (diesel) fuel-dispensing pump into the fuel-conducting passageway formed in the filler neck and suggesting that the first and second doors include an overtravel system configured to allow the doors to pivot in opposite directions to assume a single opened position even when opened using a relatively wider large-diameter (diesel) fuel-dispensing nozzle to allow passage of a medium-diameter fuel-dispensing nozzle or a large-diameter fuel-dispensing nozzle through the filler neck closure assembly and into a fuel-conducting passageway formed in the filler neck;

FIG. 9 is a broken-away perspective view of the fill tube of FIG. 6 suggesting that a small-diameter (unleaded) fuel-dispensing nozzle is inserted into the filler neck closure assembly to engage the door opener of the filler neck closure assembly and showing that the small-diameter (unleaded) fuel-dispensing nozzle is blocked from moving past the nozzle inhibitor into the filler neck;

FIG. 10 is a top plan view of the filler neck closure assembly of FIG. 9 showing that the small-diameter (unleaded) fuel-dispensing nozzle does not push the band movers of the door opener outwardly to expand the flexible band and move the doors of the nozzle inhibitor from blocking the opening in the door-support ring of the nozzle inhibitor;

FIG. 11 is a bottom plan view of the filler neck closure assembly of FIGS. 9 and 10 showing the flexible band of the door opener unmoved in the L-shaped slots formed in the doors such that the doors are not moved from blocking the opening in the door-support ring of the nozzle inhibitor;

FIG. 12 is a broken away perspective view of the fill tube of FIG. 6 suggesting that a medium-diameter (diesel) fuel-dispensing nozzle is inserted into the door opener of the filler neck closure assembly and showing that the medium-diameter (diesel) fuel-dispensing nozzle is allowed to move past the nozzle inhibitor into the filler neck;

FIG. 13 is a top plan view of the filler neck closure assembly of FIG. 12 showing that the medium-diameter (diesel) fuel-dispensing nozzle pushes the band movers of the door opener outwardly to expand the flexible band and move the doors of the nozzle inhibitor away from one another to allow the medium-diameter (diesel) fuel-dispensing nozzle to move through the opening in the door-support ring of the nozzle inhibitor;

FIG. 14 is a bottom plan view of the filler neck closure assembly of FIGS. 12 and 13 showing the flexible band of the door opener moved along a first leg of the L-shaped slots formed in the doors to cause the doors to move to allow the medium-diameter (diesel) fuel-dispensing nozzle to move through the opening in the door-support ring of the nozzle inhibitor;

FIG. 15 is a broken away perspective view of the fill tube of FIG. 6 suggesting that a large-diameter (diesel) fuel-dispensing nozzle is inserted into the door opener of the filler neck closure assembly and showing that the large-diameter (diesel) fuel-dispensing nozzle is allowed to move past the nozzle inhibitor into the filler neck;

FIG. 16 is a top plan view of the filler neck closure assembly of FIG. 15 showing that the large-diameter (diesel) fuel-dispensing nozzle pushes the band movers of the door opener outwardly to expand the flexible band and move the doors of the nozzle inhibitor to allow the large-diameter (diesel) fuel-dispensing nozzle to move through the opening in the door-supporting of the nozzle inhibitor; and FIG. 17 is a bottom plan view of the filler neck closure assembly of FIGS. 15 and 16 showing the flexible band of the door opener moved along a first leg of the L-shaped slots formed in the doors to cause the doors to uncover the opening formed by the door-support ring and along a second leg of the L-shaped slots formed in the doors so that the doors do not overtravel past the position in which the opening is uncovered providing for lost motion of the flexible band relative to the first and the second doors allowing for radial movement of the band movers to accommodate the large-diameter (diesel) fuel-dispensing nozzle without accounting for spaced needed to accommodate additional movement of the first and the second doors.

DETAILED DESCRIPTION

Figure 3:
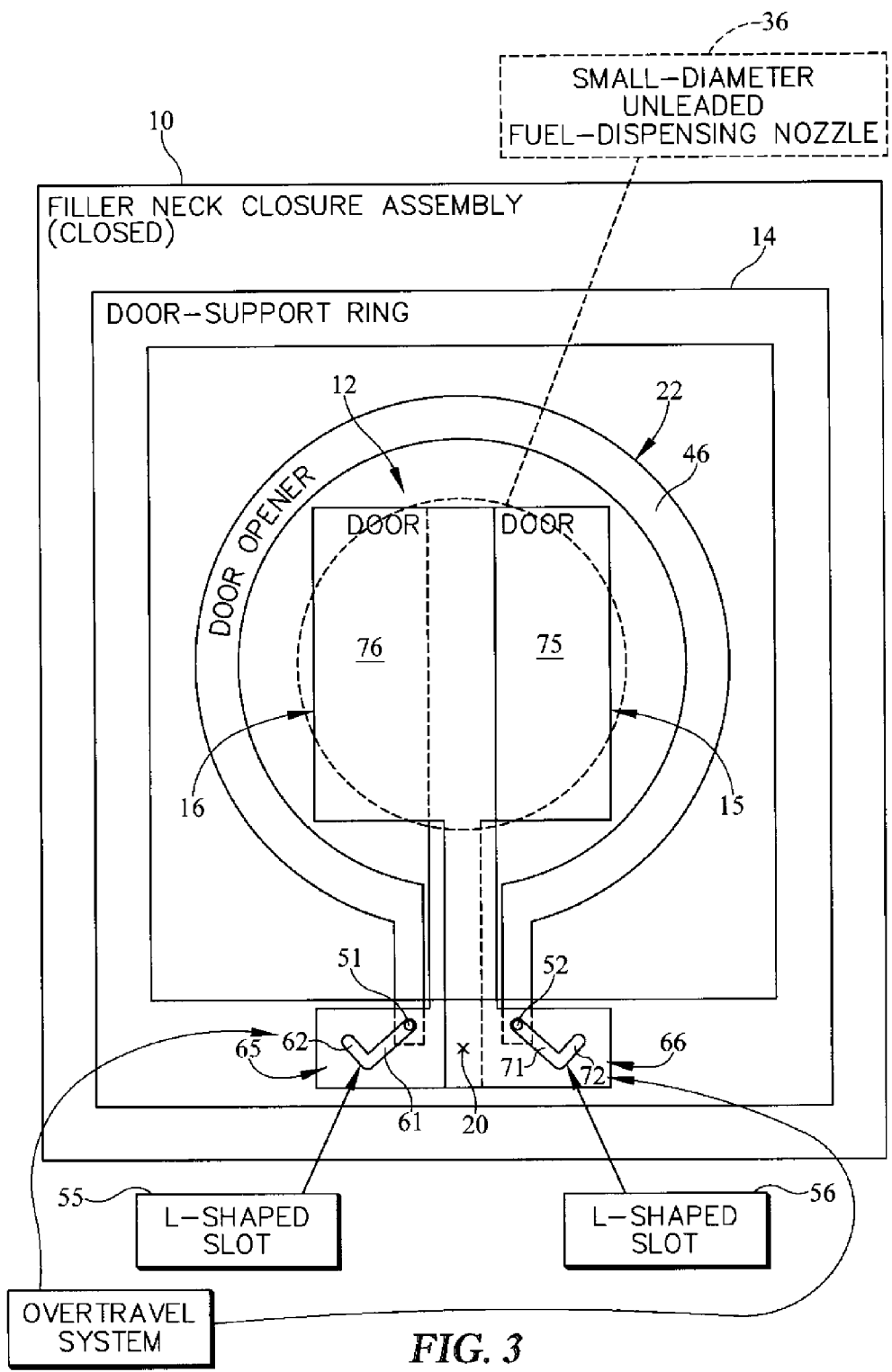
FIG. 3 is another diagrammatic view of the filler neck closure assembly generally viewed as suggested by line 3-3 in FIG. 2 showing that when a small-diameter (unleaded) fuel-dispensing nozzle is inserted into the filler neck closure assembly, the first and second doors of the nozzle inhibitor are positioned to cooperate with one another to block movement of the small-diameter (unleaded) fuel nozzle past the nozzle inhibitor into a fuel-conducting passageway formed in the filler neck to block a user from dispensing unleaded fuel into the filler neck and the fuel tank of the diesel-engine vehicle.

An illustrative filler neck closure assembly 10 incorporated into a fuel-tank fill tube 21 of a diesel vehicle 11 is exposed by opening an outer access door 24 relative to a vehicle body panel 26 as shown in FIG. 1. The filler neck closure assembly 10 is coupled to a filler neck 28 (shown in phantom) leading to a vehicle fuel tank 30 (also shown in phantom). Filler neck closure assembly 10 is configured in accordance with the present disclosure to allow only relatively larger (medium- and large-) diameter (diesel) fuel-dispensing nozzles 32A, 32B into fuel-tank fill tube 21 as suggested diagrammatically in FIGS. 1 and 2.

Figure 4:
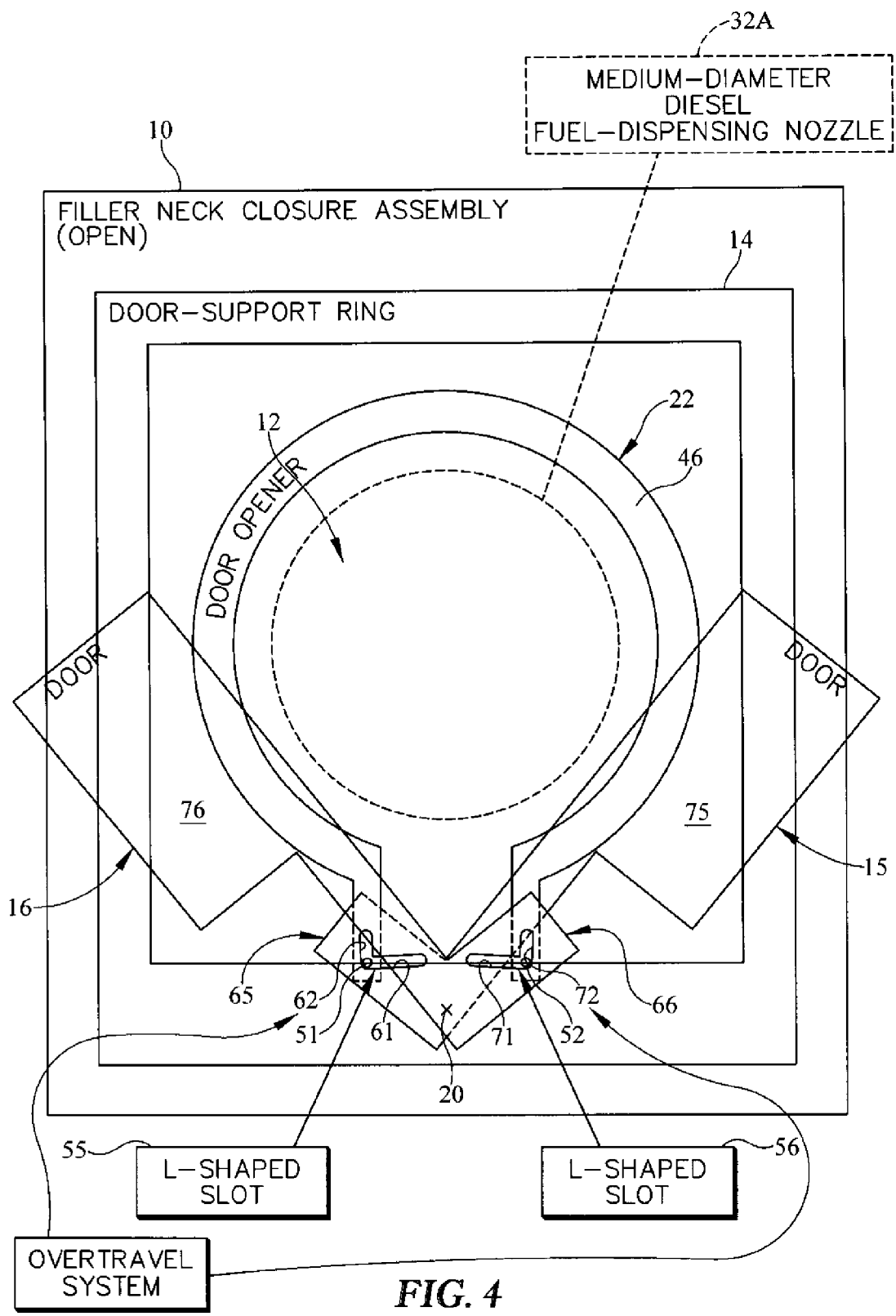
FIG. 4 is a view similar to FIG. 3 showing that when a medium-diameter (diesel) fuel nozzle is inserted into the filler neck closure assembly the first and second doors of the nozzle inhibitor pivot away from one another to assume spread-apart opened positions to allow the medium-diameter (diesel) fuel-dispensing nozzle to be inserted past the nozzle inhibitor and into the filler neck so that a user can dispense diesel fuel into the filler neck and the fuel tank of the diesel-engine vehicle, and showing that a door opener included in the filler neck closure assembly is moved by the medium-diameter (diesel) fuel-dispensing nozzle within L-shaped slots formed in the doors along first legs of the L-shaped slots to cause the doors to pivot in opposite directions out of the way of the inwardly moving medium-diameter (diesel) fuel-dispensing nozzle.
Figure 5:
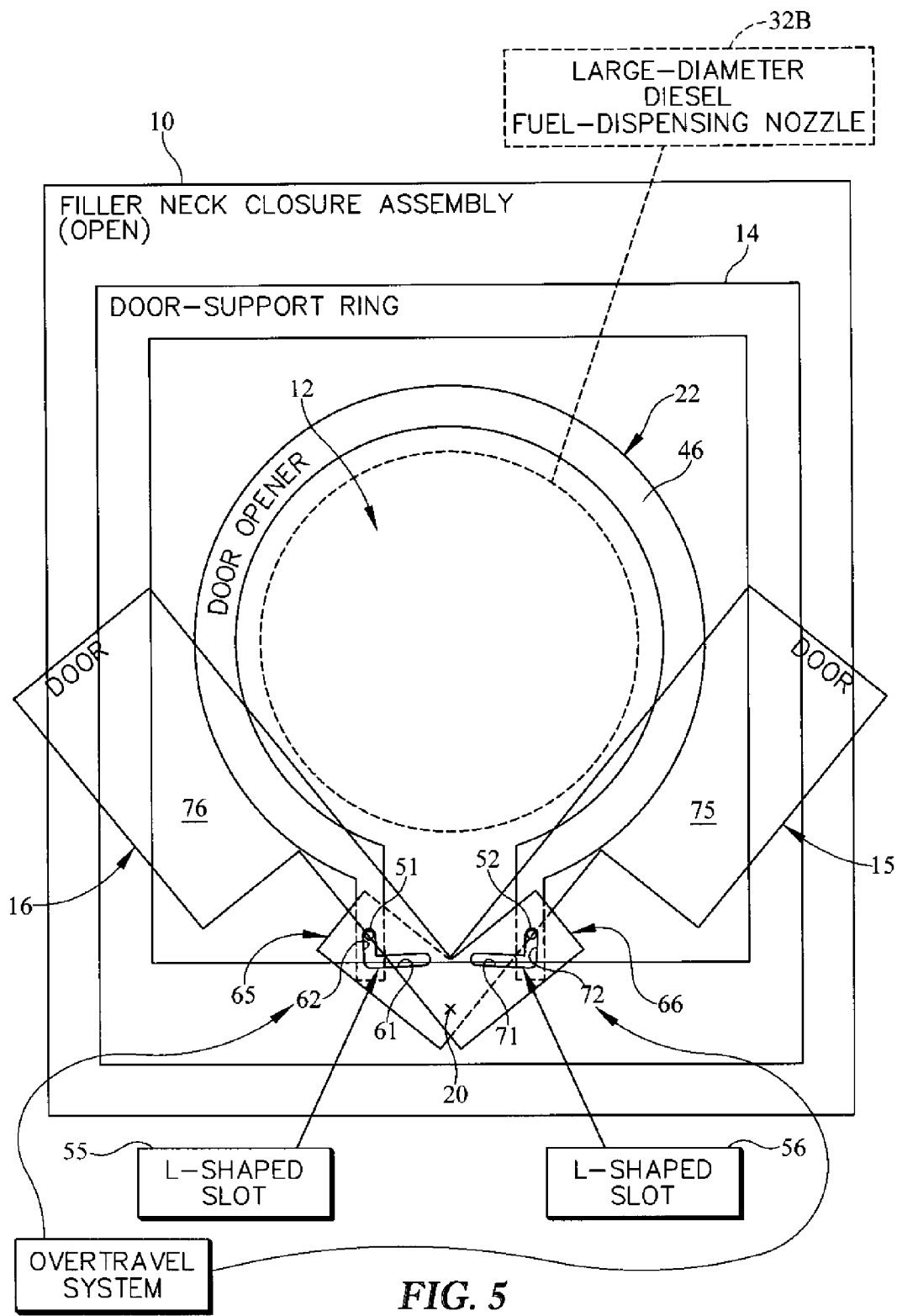
FIG. 5 is a view similar to FIGS. 3 and 4 showing that when a large-diameter (diesel) fuel-dispensing nozzle is inserted into the filler neck closure assembly the first and second doors of the nozzle inhibitor pivot away from one another to assume the same spread-apart opened positions shown in FIG. 4 to allow the large-diameter (diesel) fuel-dispensing nozzle to be inserted past the nozzle inhibitor and into the filler neck so that a user can dispense diesel fuel into the filler neck and the fuel tank of the diesel-engine vehicle, and showing that the door opener included in the filler neck closure assembly is moved by the large-diameter (diesel) fuel-dispensing nozzle within the L-shaped slots formed in the doors along first legs of the L-shaped slots to cause the doors to pivot out of the way of the large-diameter (diesel) fuel-dispensing nozzle and along second legs of the L-shaped slots that permit overtravel of the door opener within the L-shaped slots without further pivoting the doors relative to one another about the single door-pivot axis.

An overtravel system 62, 72 in accordance with the present disclosure is included in filler neck closure assembly 10 to allow large-diameter (diesel) fuel-dispensing nozzles 32B to be inserted into fuel tank fill tube 21 as suggested diagrammatically in FIG. 5 and illustratively in FIGS. 15-17 without opening doors 15, 16 included in a nozzle inhibitor 12 provided in filler neck closure assembly 10 to an opened position wider than the opened position established using a medium-diameter (diesel) fuel-dispensing nozzle 32A as suggested diagrammatically in FIG. 4 and illustratively in FIGS. 12-14. Doors 15, 16 of nozzle inhibitor 12 are arranged to pivot relative to one another about a single door-pivot axis 20 in illustrative embodiments.

The filler neck closure assembly 10 includes a nozzle inhibitor 12 and a door opener 22 as shown diagrammatically in FIG. 2. Nozzle inhibitor 12 is configured to provide inhibitor means for preventing insertion of the small-diameter (unleaded) fuel-dispensing pump nozzle 36 into a fuel-conducting passageway 29 formed in the filler neck 28 included in the fuel-tank fill tube 21 and coupled to the vehicle fuel tank 30 while allowing insertion of a medium-diameter diesel fuel-dispensing nozzle 32A as suggested in FIGS. 2 and 4 or large-diameter diesel fuel-dispensing nozzle 32B into the fuel-conducting passageway 29 formed in the filler neck 28 as suggested in FIGS. 2 and 5.

Doors 15, 16 included in nozzle inhibitor 12 pivot apart to assume an opened position as suggested diagrammatically in FIG. 4 in response to engagement of an inwardly moving medium-diameter (diesel) fuel-dispensing nozzle 32A with the door opener 22 included in filler neck closure assembly 10 (such opening of doors 15, 16 is also shown illustratively in FIGS. 12-14). Because filler neck closure assembly 10 includes overtravel system 62, 72, doors 15, 16 can pivot apart to assume the same opened position as suggested diagrammatically in FIG. 5 in response to engagement of an inwardly moving large-diameter (diesel) fuel-dispensing nozzle 32B with the door opener 22 included in filler neck closure assembly 10 (such opening of doors 15, 16 is also shown illustratively in FIGS. 15-17).

As suggested in FIG. 1, a diesel vehicle 11 having a diesel motor includes a fuel tank 30 and a fuel-tank fill tube 21 comprising a filler neck closure assembly 10 in accordance with the present disclosure and a filler neck 28 extending between fuel tank 30 and filler neck closure assembly 10. Because vehicle 11 has a diesel engine, only diesel fuel 34 can be pumped into fuel tank 30. Filler neck closure assembly 10 includes a nozzle inhibitor 12 that is configured to block admission of a small-diameter (unleaded) fuel-dispensing nozzle 36 into fuel-conducting passageway 29 formed in filler neck 28 during a tank-refueling activity to avoid accidental discharge of unleaded fuel 38 into fuel tank 30 of a diesel vehicle 11 having a diesel motor as suggested diagrammatically in FIGS. 1-3 and illustratively in FIGS. 9-11. Nozzle inhibitor 12 is configured to admit a medium-diameter (diesel) fuel-dispensing nozzle 32A into fuel-conducting passageway 29 formed in filler neck 28 during a tank-refueling activity as suggested diagrammatically in FIGS. 2 and 4 an illustratively in FIGS. 12-14.

Nozzle inhibitor 12 includes an overtravel system (e.g., slot 62 formed in outer tab 65 formed in door 15 and slot 72 formed in outer tab 66 formed in door 16) that is operable to sense the presence of an inwardly moving relatively wider large-diameter (diesel) fuel-dispensing nozzle 32B in filler neck closure assembly 10 as nozzle 32B engages door opener 22 and then to pivot doors 15, 16 about door-pivot axis 20 to assume the same opened position as suggested diagrammatically in FIGS. 2 and 5 and illustratively in FIGS. 15-17 so that the relatively wider large-diameter (diesel) fuel-dispensing nozzle 32B can pass into fuel-conducting passageway 29 formed in filler neck 28 to deliver diesel fuel 34 to fuel tank 30 without damaging any components included in filler neck closure assembly 10 and without requiring the size of assembly 10 to be increased. Filler neck closure assembly 10 is thus configured to accept a wide variety of wide-diameter (diesel) fuel-dispensing nozzles to enhance the versatility of fuel-tank fill tube 21.

As suggested in FIG. 1, a diesel-engine vehicle 11 is provided with a fuel-tank fill tube 21 and an outer filler-neck access door 24 has been moved by a tank-refueling attendant relative to a vehicle body panel 26 to expose a filler neck closure assembly 10 included in fill tube 21 and coupled to an outer end of filler neck 28. A small-diameter (unleaded) fuel-dispensing nozzle 36 is coupled to unleaded fuel supply 38 and a symbol 27 suggests that nozzle 36 cannot be passed through filler neck closure assembly 10 to reach into fuel-conducting passageway 29 formed in filler neck 28 to deliver unleaded fuel 38 into a fuel tank 30 that should only receive diesel fuel 34 from a (diesel) fuel-dispensing nozzle such as nozzle 32A or 32B.

Nozzle inhibitor 12 includes a door-support ring 14, a first door 15, and a second door 16. First door 15 is mounted on door-support ring 14 for pivotable movement about a door-pivot axis 20 between a closed position suggested in FIGS. 2 and 3 and an opened position suggested in FIG. 4. Second door 15 is mounted on door-support ring 14 for pivotable movement about door-pivot axis 20 between a closed position suggested in FIGS. 2 and 3 and an opened position suggested in FIG. 4. The door-pivot axis 20 extends parallel to the filler neck 28.

Figure 6:
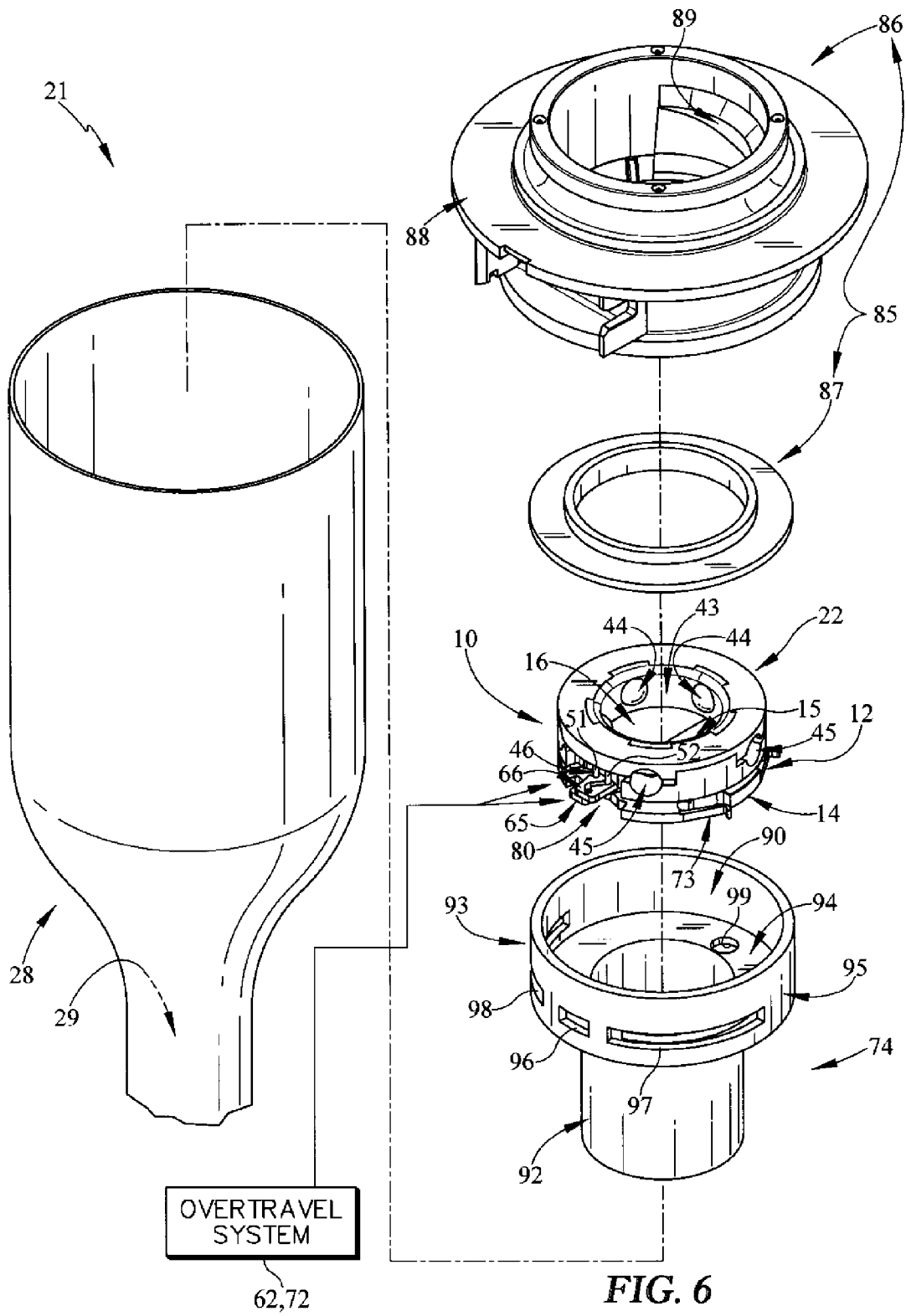
FIG. 6 is an exploded perspective assembly view of an illustrative fill tube showing that the fill tube includes (in series, left to right) a filler neck, a flow director, a filler neck closure assembly made in accordance with the present disclosure to include a nozzle inhibitor having an overtravel system, a retainer flange, and an outer fuel-dispensing nozzle receiver cooperating with the retainer flange to form a nozzle-inlet unit and suggesting that the filler neck closure assembly is adapted to be received in a chamber formed by the filler neck and to be trapped in the chamber by the fuel-nozzle receiver and an adapter flange.

An exploded perspective assembly view of fuel-tank fill tube 21 is provided in FIG. 6. Fill tube 21 includes a filler neck 28 formed to include a fuel-conducting passageway 29. Fill tube 21 also includes a normally closed filler neck closure assembly 10 that is configured to control admission of a fuel-dispensing nozzle into the fuel-conducting passageway 29 of the filler neck 28. A nozzle inhibitor 12 included in filler neck closure assembly 10 is configured to block passage of a small-diameter (unleaded) fuel-dispensing nozzle 36 through filler neck closure assembly 10. Nozzle inhibitor 12 is configured to allow passage of a medium-diameter (diesel) fuel-dispensing nozzle 32A through filler neck closure assembly 10. Nozzle inhibitor 12 is also configured to allow passage of a relative larger large-diameter (diesel) fuel-dispensing nozzle 32B through filler neck closure assembly 10.

As suggested in FIG. 6, nozzle-inlet unit 85 comprises an outer fuel-dispensing nozzle receiver 86 and a retainer flange is included in fill tube 21. Fill tube 21 also includes a flow director 74 sized to fit into an outer portion of filler neck 28 and direct fuel flow into fuel-conducting passageway 29 formed in filler neck 28. Filler neck closure assembly 10 is arranged to lie between nozzle-inlet unit 85 and flow director 74 as suggested in FIG. 6.

Nozzle inhibitor 12 included in filler neck closure assembly 10 includes pivotable doors 15, 16 that can be closed to block passage of a small-diameter (unleaded) fuel-dispensing nozzle 36 through filler neck closure assembly 10 so that unleaded fuel cannot be discharged into diesel fuel tank 30 through filler neck 28. Door 15 includes an outer tab 66 formed to include a drive-pin slot 56 having a first leg 71 and a second leg 72. Door 16 includes an outer tab 65 formed to include a drive-pin slot 55 having a first leg 61 and a second leg 62. Second legs 62, 72 cooperate to form an overtravel system in accordance with the present disclosure for allowing a relatively larger large-diameter (diesel) fuel-dispensing nozzle 32B to pass through filler neck closure assembly 10 in addition to allowing passage of a medium-diameter (diesel) fuel-dispensing nozzle 32A through filler neck closure assembly 10.

Figure 7:
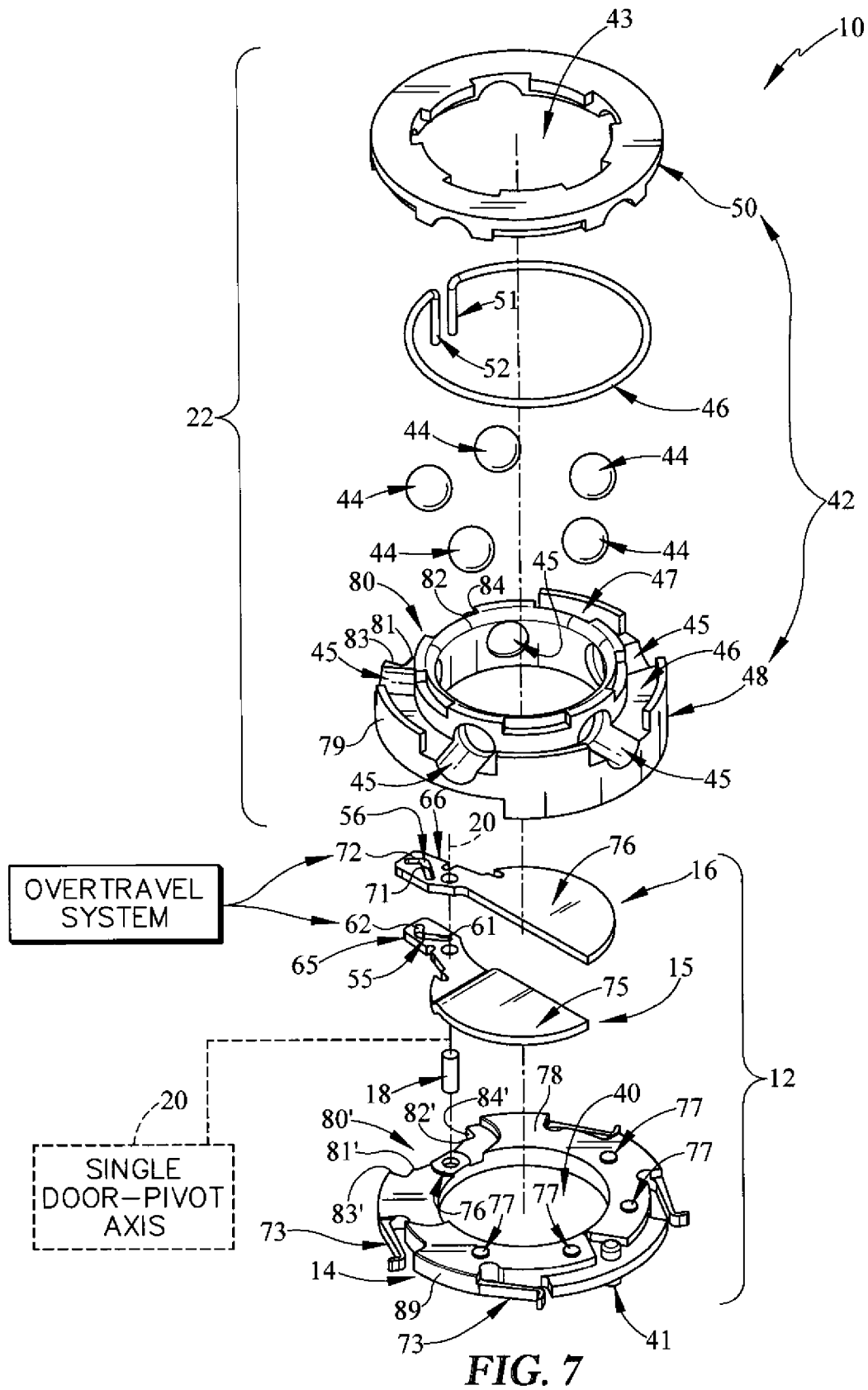
FIG. 7 is an exploded perspective assembly view of the filler neck closure assembly showing that the nozzle inhibitor of the filler neck closure assembly includes a door-support ring defining a central opening and two doors mounted to the door-support ring to block or allow a nozzle to pass through the central opening and showing that the door opener includes a housing, a flexible band adapted to be mounted in the housing, and a plurality of ball bearing band movers adapted to be mounted in the housing and to expand the flexible band when a medium-diameter or large-diameter (diesel) fuel-dispensing nozzle is inserted into the filler neck closure assembly to engage the door opener.

An illustrative nozzle inhibitor 12 includes a door-support ring 14, a first door 15, and a second door 16 as shown in FIG. 7. The door-support ring 14 is formed to include an opening 40 sized to allow a medium-diameter or a large-diameter fuel-dispensing nozzle 32A or 32B to pass through a central opening 40 formed in the door-support ring 14. A single door-pivot pin 18 illustratively couples the first and the second doors 15, 16 to the door-support ring 14 for rotation about the door-pivot axis 20 as shown in FIG. 7. In the illustrative embodiment, the first and the second doors 15, 16 pivot in opposite directions about the door-pivot axis 20 to move the doors 15, 16 in nozzle inhibitor 12 between a closed position (as shown in FIGS. 9-11) and an opened position (shown in FIGS. 12-14 and in FIGS. 15-17).

First door 15 of nozzle inhibitor 12 includes a closure panel 75 and an outer tab 65 coupled to a perimeter edge of closure panel 75 as shown in FIG. 7. Outer tab 65 is supported for movement about door-pivot axis 20 relative to door-support ring 14. Outer tab 65 is formed to include a multi-direction L-shaped pin-receiving slot 55 having a first leg 61 and a second "overtravel" leg 62. Closure panel 75 has a semicircular shape and is sized to cover about half the central opening 40 formed in door-support ring 14 when first door 15 is moved to assume the closed position.

Second door 16 of nozzle inhibitor 12 includes a closure panel 76 and an outer tab 66 coupled to a perimeter edge of closure panel 76 as shown in FIG. 7. Outer tab 66 is supported fro movement about door-pivot axis 20 relative to door-support ring 14. Outer tab 66 is formed to include a multi-direction L-shaped pin-receiving slot 56 having a first leg 71 and a second "overtravel" leg 72. Closure panel 76 has a semicircular shape and is sized to cover about half the central opening 40 formed in door-support ring 14 when second door 16 is moved to assume the closed position. Second legs 62, 72 cooperate to form an overtravel system included in outer tabs 65, 66 of first and second doors 15, 16 of nozzle inhibitor 12.

The door opener 22 illustratively includes a housing 42, plurality of band movers 44, and a flexible band 46 as shown, for example, in FIG. 6. The housing 42 includes a lower shell 48 and an upper shell 50 that cooperate to support the plurality of band movers 44 and the flexible band 46 for movement relative to the housing 42. The plurality of band movers 44 are illustratively mounted in the housing 42 to move inward and outward in a radial direction relative to the housing 42 as suggested in FIGS. 7-15. The flexible band 46 is illustratively a wire band mounted in the housing 42 to be elastically expanded and contracted within the housing 42 as suggested in FIGS. 7-15.

Figure 8:
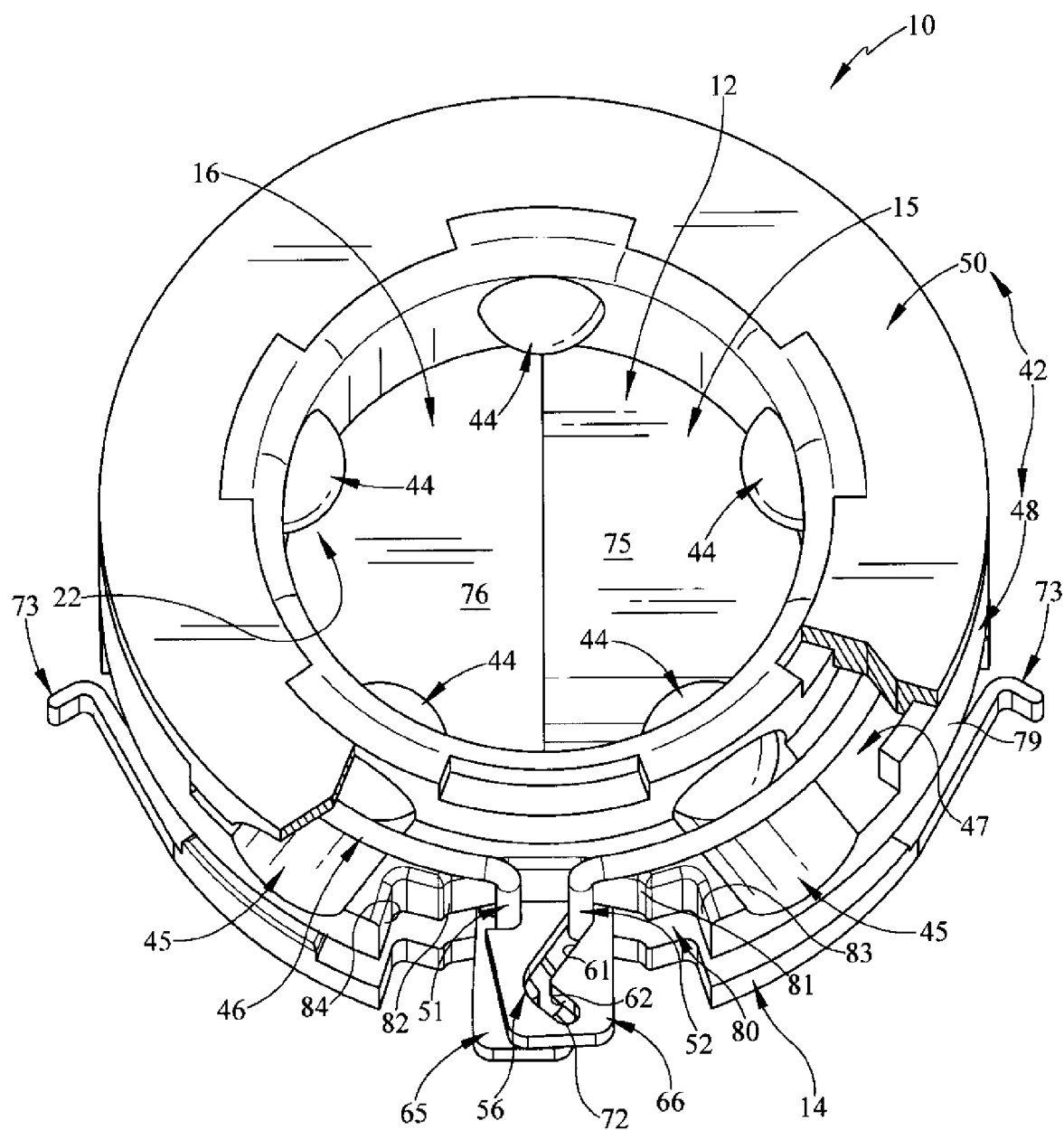
FIG. 8 is a perspective view of the filler neck closure assembly of FIG. 7 assembled and partially broken away to show that the flexible bands extends into L-shaped slots formed in the doors of the nozzle inhibitor to move the doors relative to the door-support ring when the flexible band is expanded in response to a medium-diameter or large-diameter (diesel) fuel-dispensing nozzle being inserted into the filler neck closure assembly to engage the door opener.

The housing 42 extends around an opening 43 and is formed to include a plurality of generally cylindrical chambers 45, an annular cavity 47, and a guide notch 80 as shown in FIGS. 7 and 8. The opening 43 is sized to receive the large-diameter fuel nozzle 32B along with any relatively smaller diameter fuel-dispensing nozzles 36 or 32A. Chambers 45 extend radially outward from the opening 43 and receive the plurality of band movers 44. The annular cavity 48 is sized to receive the flexible band 46 that extends around most of the housing 42. The guide notch 80 causes the even opening of the doors 15, 16.

The plurality of band movers 44 are illustratively ball bearings as shown in FIG. 7. Each of the plurality of band movers 44 is mounted in a corresponding chamber 45 formed by the housing 42 to move inward and outward in a radial direction relative to the housing 42 as suggested in FIGS. 7-15. Each of the plurality of band movers 44 is arranged to extend into the opening 43 defined by the housing 42 and to be pushed outwardly, away from the opening 43, when the medium-diameter or large-diameter fuel-dispensing nozzles 32A, 32B are inserted into the filler neck closure assembly 10 as suggested in FIGS. 12-17.

The flexible band 46 illustratively extends around the plurality of band movers 44 and is adapted to expand/contract around the opening 43 defined by the housing 42 as shown in FIG. 8. The flexible band 46 is made from elastic metallic wire and is arranged to push the plurality of band movers 44 inwardly toward the opening 43 until the band movers 44 are acted upon by a nozzle being inserted into the door opener 22 to push the band movers 44 outwardly and expand the flexible band 46 as shown in FIGS. 12-17. The flexible band 46 illustratively has a first end 51 that extends into a companion L-shaped slot 55 formed in outer tab 65 of first door 15 and a second end 52 that extends into a companion L-shaped slot 56 formed in outer tab 66 of second door 16. These ends 51, 52 cooperate to pivot doors 15, 16 relative to one another about door-pivot axis 20 between opened and closed positions in response to expansion and contraction of flexible band 46.

In the illustrative embodiment, the filler neck closure assembly 10 is received in a chamber 90 formed by a flow director 74 as suggested in FIG. 6. The flow director includes a fuel-transport tube 92 and a closure receiver 93 coupled to the fuel-transport tube 92. The fuel-transport tube 92 extends from the closure receiver 93 and down into the fuel-tank filler neck 28 to guide a nozzle inserted through the filler neck closure assembly 10 toward the fuel tank 30. The closure receiver 93 defines the chamber 90 and is adapted to support the filler neck closure assembly 10.

The closure receiver 93 illustratively includes a floor 94 and a side wall 95 as shown in FIG. 6. The floor 94 extends outward from the fuel-transport tube 92 and underlies the filler neck closure assembly 10. The floor 94 is formed to include a locating hole 99 that receives a locator peg 41 that extends downwardly from the door-support ring 14 of the nozzle inhibitor 12 to locate the filler neck closure assembly 10. The side wall 95 extends from the floor and around the filler neck closure assembly 10 to locate the filler neck closure assembly 10 as suggested in FIG. 6. The side wall 95 is formed to include a door tab passage slot 96 and door panel passage slots 97, 98.

The door tab passage slot 96 is sized and arranged so that the outer tabs 65, 66 of the doors 15, 16 extend out of the closure receiver 90 as suggested in FIG. 6. The door panel passage slots 97, 98 are sized and arranged so that the closure panels 75, 76 of the door panels 15, 16 extend out of the closure receiver 90 when the doors 15, 16 are moved to the opened positions allowing passage of a fuel nozzle through the central opening 40 formed in the door-support ring 14 of the nozzle inhibitor 12.

The nozzle inhibitor 12 further includes a bushing 76, a plurality of pads 77, and a plurality of spring fingers 73 as shown in FIG. 7. The bushing 76, pads 77, and spring fingers 73 are all monolithically formed with the door-support ring 14 in the illustrative embodiment. The bushing 76 extends around the pin 18 between the base plate 14 and the doors 15, 16 to provide a bearing surface for movement of the door 15. The pads 77 are arranged to underlie the doors 15, 16 and blocks the doors 15, 16 from being improperly pried open. The spring fingers 73 extend outwardly from the door-support ring 14 away from the opening 40 to center the nozzle inhibitor 12 within the closure receiver 90.

The pads 77 are illustratively arranged in a circumferentially-spaced-apart pattern over a top surface 78 of the door-support ring 14 around the opening 40 as shown in FIG. 7. The pads 77 are located between the door-support ring 14 and the doors 15, 16 to engage the doors 15, 16 when they are pushed downwardly by a small-diameter (unleaded) fuel-dispensing nozzle 36 being inserted into the filler neck closure assembly 10. The pads 77 thus prevent the doors 15, 16 from opening when a small-diameter (unleaded) fuel-dispensing nozzle 36 pushes the doors 15, 16 toward the door-support ring 14 and tries to pry them open.

The spring fingers 73 push against the side wall 95 of the closure receiver 93 and push the door-support ring 14 along with the rest of the filler neck closure assembly 10 toward the center of the chamber 90 as suggested in FIG. 6. Each spring finger 73 is arranged to extend outwardly from the door-support ring 14 and circumferentially around a portion of the door-support ring 14.

In the illustrative embodiment, the fill tube 21 includes an outer fuel-dispensing nozzle receiver 86 and a retainer flange 87 in addition to the filler neck 28 and the filler neck closure assembly 10 as shown, for example, in FIG. 6. The fuel-nozzle receiver 86 is illustratively adapted for use with a screw-on fuel cap (not shown). The retainer flange 87 is adapted to be coupled to the closure receiver 94 and extends over the chamber 90 formed by the closure receiver 94 to block the filler neck closure assembly 10 from moving out of the chamber 90.

The fuel-nozzle receiver 86 is formed to include internal threads 89 and a mount ring 88 as shown in FIG. 6. The internal threads 89 are adapted to mate with external threads of a screw-on fuel cap. The mount ring 88 is adapted to be coupled to the filler neck 28. In alternative embodiments, the receiver 86 may be a capless unit including a flapper door that blocks dust and dirt from entering the filler neck 28 prior to insertion of a fuel nozzle into the fill tube 21.

Turning now to FIGS. 9-11, the filler neck closure assembly 10 is shown with the first and second doors 15, 16 nozzle inhibitor 12 in the closed position. First door 15 blocks access through a first portion of the central opening 40 in the door-support ring 14 and the second door 16 blocks access through a second portion of the central opening 40 in the door-support ring 14 such that the first and the second doors 15, 16 cooperate to block access to any filler neck 28 attached to the filler neck closure assembly 10 prior to a user inserting a medium-diameter or a large-diameter (diesel) fuel-dispensing nozzle 32A, 32B into the door opener 22. Insertion of a medium-diameter or a large-diameter (diesel) fuel-dispensing nozzle 32A, 32B into the door opener 22 pushes the plurality of band movers 44 outwardly in a radial direction and moves the first and second doors 15, 16 of nozzle inhibitor 12 about door-pivot axis 20 to the same opened position as shown in FIGS. 12-14 or in FIGS. 15-17.

When no fuel-nozzle or a small-diameter fuel nozzle 36 are inserted into the door opener 22, the plurality of band movers 44 included in the door opener 22 are unmoved as shown in FIGS. 9-11. Thus, the doors 15, 16 of nozzle inhibitor 12 remain in the closed position blocking admission to the filler neck 28 through the central opening 40 in the door-support ring 14 as shown in FIG. 10.

Further, while the doors 15, 16 of nozzle inhibitor 12 are in the closed positions, a first end 51 of the flexible band 46 is received in an L-shaped slot 55 formed in an outer tab 65 included in the first door 15 as shown in FIG. 8. Similarly, a second end 52 of the flexible band 46 is received in an L-shaped slot 56 formed in an outer tab 66 included in the second door 16 as shown in FIG. 8.

The doors 15, 16 of nozzle inhibitor 12 have moved to the opened position when a user inserts a medium-diameter (diesel) fuel nozzle 32A into the door opener 22 as suggested in FIGS. 12-14. When the doors 15, 16 of nozzle inhibitor 12 are moved to the opened position, the first and the second doors 15, 16 allow access through the central opening 40 in the door-support ring 14 into a filler neck 28 attached to the filler neck closure assembly 10 as shown in FIG. 12. The medium-diameter (diesel) fuel nozzle 32A pushes the plurality of band movers 44 outwardly in a radial direction and thereby moves the doors 15, 16 of nozzle inhibitor 12 to opened positions as shown in FIG. 13. Further, the first end 51 of the flexible band 46 has traveled along a first leg 61 of the L-shaped slot 55 formed in the outer tab 65 of the first door 15 to pivot the first door 15 about the door-pivot axis 20 as shown in FIG. 14. Similarly, that the second end 52 of the L-shaped flexible band 46 has traveled along a first leg 71 of the L-shaped slot 56 formed in the outer tab 66 of the second door 16 to pivot the second door 16 about the door-pivot axis 20.

The doors 15, 16 of nozzle inhibitor 12 are also moved to the opened positions when a user inserts a large-diameter (diesel) fuel-dispensing nozzle 32B into the door opener 22 as suggested in FIGS. 15-17. As with the medium-diameter (diesel) fuel-dispensing nozzle 32A, the large-diameter (diesel) fuel-dispensing nozzle 32B pushes the plurality of band movers 44 outwardly in a radial direction (albeit further) and thereby moves the doors 15, 16 of nozzle inhibitor 12 to opened positions as shown in FIGS. 15-17. The doors 15, 16 are moved to the same opened positions shown in FIGS. 12-14 owing to the provision of an overtravel system 62, 72 in outer tabs 65, 66 of doors 15, 16.

When the large-diameter (diesel) fuel-dispensing nozzle 32B pushes the band movers 44 further outward in the radial direction, the first end 51 of the flexible band 46 travels along first and second legs 61, 62 of the L-shaped slot 55 formed in the outer tab 65 of the first door 15 to pivot the first door 15 about the door-pivot axis 20 without causing the first door 15 to overtravel past the position in which the first portion of the central opening 40 in the door-support ring 14 is open. Similarly the second end 52 of the flexible band 46 travels along first and second legs 71, 72 of the slot 56 formed in the outer tab 66 of the second door 16 to pivot the second door 16 about the door pivot-axis 20 without causing the second door 16 to overtravel past the position in which the second portion of the central opening 40 in the door-support ring 14 is open. As a result of the lost motion between the ends 51, 52 of the flexible band 46 relative to the doors 51, 52, the first and the second doors 15, 16 do not open further than required to unblock the central opening 40 reducing the need for space in the fill tube 21 to accommodate additional movement of the first and the second doors 15, 16.

In the illustrative embodiment, the guide notch 80 formed in the lower shell 48 of the housing 42 extends inwardly toward the opening 43 from an outer surface 79 of the lower shell 48 of the housing 42 as shown, for example, in FIGS. 7 and 8. The guide notch 80 forms inner corners 81, 82 and outer corners 83, 84 as shown in FIG. 8. In the illustrative embodiment, another guide notch 80' formed in the door-support ring 14 of the nozzle inhibitor 12 having a profile that matches the guide notch 80 but extends inwardly toward the opening 40 from an outer surface 89 of the door-support ring 14 as shown, for example, in FIGS. 7 and 8. The guide notch 80' forms inner corners 81', 82' and outer corners 83', 84' as shown in FIG. 8.

Ends 51, 52 of the flexible band 46 move along the initial portion of the door slots 61, 71 and simultaneously to inner corners 81, 82, 81', 82' in the guide notches 80, 80'. Each end 51, 52 is defined by a wire as suggested in the drawings. If one wire end 51, 52 moves into initial contact with inner corners 81, 81'/82, 82' ahead of the opposite wire 51, 52 contacting opposing inner corner 81, 81'/82, 82', the contact temporarily causes resistance and encourages the other end of the wire 51, 52 to move to the opposite inner corner 81, 82, 81', 82' before the flexible band 46 expands further. Similarly, if one wire end 51, 52 moves into initial contact with corners 83, 83'/84, 84' ahead of the opposite wire 51, 52 contacting opposing outer corner 83, 83'/84, 84/, the contact temporarily causes resistance and encourages the other end of the wire 51, 52 to move to the opposite inner corner 83, 83'/84, 84'. This resistance encourages even opening of doors 15, 16 during insertion through the closure assembly 10.

The illustrative closure assembly 10 uses actuators 44 which are moved radially out from a center point and expanding a spring band 46 as suggested in FIG. 7. The actuators 44 cause the ends 51, 52 of the band 46 to do some work. In this instance the actuators 44 are made from ball bearings and the spring band 46 is a circlet of wire rather than a ribbon style band (in other embodiments a ribbons style band may be used). The principle is that small changes in diameter achieve larger changes in circumference. If the circumference is fixed then the diameter change translates into usable work.

The ends 51, 52 of the wire spring band 46 are mated to two half doors 15, 16, one wire end 51, 52 for each. The doors 15, 16 are pinned and rotate about the same door-pivot axis 20 similar to the operation of a set of scissors. In this case as one end of the wire 51 is pulled its corresponding door 15, on the other side of the door-pivot axis 20, moves in the opposite direction. The other end of the wire 52 is coupled similarly to the other door 16. Insertion of the nozzle 32A, 32B in the closure assembly 10 pushes the balls 44 outward radially expanding the diameter of the band 46 and pulling on both ends 51, 52 of the wire 46 simultaneously causing the doors 15,16 to move away from each other and open a path for the fuel-dispensing nozzle 32A, 32B.

The location of the point of rotation established by door-pivot axis 20 on the housing as well as the circumference of the wire band 46 and the shape of the doors 15, 16 have been designed such that the doors 15, 16 will swing open and allow passage of the smallest diameter (diesel) fuel-dispensing nozzle 32A that is commercially available is inserted. In order to prevent the doors 15, 16 from swinging further, with insertion of larger nozzles 32B, a bearing surface has been made in the housing 42 and multi-directional slots 55, 56 formed in the doors 15, 16.

When the smallest diameter (diesel) nozzle 32A is inserted the wire ends 51, 52 move along the initial portion of the first door slots 61, 71 of L-shaped slots 55, 56 and simultaneously to a slight corner feature 81, 82 in the track 80 on the housing 42, if one wire end has moved farther than the other this corner feature 81, 82 causes resistance and forces the focus of the pull on the other end of the wire 51, 52. If a larger nozzle 32B is inserted the ends of the wire 51, 52 will ride over the corner feature 81, 82 in the housing 42 and down the second direction of the slots 55, 56 in the door 15, 16 while doing no further work to open the door 15, 16. Additional stop features can also be added to the housing 42 to positively stop the doors 15, 16. While the illustrative closure assembly 10 is adapted for use with medium to large diesel sized nozzles (e.g., 23.6 mm-25.5 mm), in other embodiments, the closure assembly 10 may be adapted for use with oversized nozzles or other fuel dispensing nozzles (e.g. up to or greater than 32.0 mm). The track or guide feature 80 in the housing 42 causes the even opening of the doors along with the positive stop 82, 83 for the doors and the multi-directional slots 55, 56 in the doors 15, 16 themselves which prevent movement after the full open position is attained.

The invention claimed is:

1. A filler neck closure assembly associated with a vehicle fuel tank filler neck, the assembly comprising
    a nozzle inhibitor configured to provide means for preventing insertion of a small-diameter unleaded fuel-dispensing pump nozzle into a fuel-conducting passageway formed in a filler neck included in the fuel tank fill tube and coupled to a vehicle fuel tank while allowing insertion of a medium-diameter or large-diameter diesel fuel-dispensing pump nozzle into the fuel-conducting passageway formed in the filler neck, the nozzle inhibitor including a door-support ring, a first door coupled to the door-support ring to pivot relative to the door-support ring about a door-pivot axis, and a second door coupled to the door-support ring to pivot relative to the door-support ring about a door-pivot axis, the first door and the second door movable relative to the door-support ring from a closed position blocking access through the fuel-conducting passageway to an opened position allowing access through the fuel-conducting passageway,
    a door opener including a flexible band and a plurality of band movers, the flexible band movable from a normally contracted position to a partly-expanded position and to a fully-expanded position, the plurality of band movers being arranged to lie in locations around the fuel-conducting passageway to push the flexible band to the partly-expanded position in response to being engaged by a medium-diameter diesel fuel-dispensing nozzle inserted into the fuel-conducting passageway and to push the flexible band to the fully-expanded position in response to being engaged by a large-diameter diesel fuel-dispensing nozzle inserted into the fuel-conducting passageway, and
    overtravel means for establishing a lost-motion driving connection between the flexible band and the first door to convert movement of the flexible band from the contracted position to the partly-expanded position into movement of the first door relative to the door-support ring and without converting further movement of the flexible band from the partly-expanded position to the fully-expanded position into movement of the first door relative to the door-support ring and for establishing a lost-motion driving connection between the flexible band and the second door to convert movement of the flexible band from the contracted position to the partly-expanded position into movement of the second door relative to the door-support ring and without converting further movement of the flexible band from the partly-expanded position to the fully-expanded position into movement of the second door relative to the door-support ring so that the first door and the second door do not overtravel past the opened position when a large-diameter diesel fuel-dispensing nozzle is inserted into the fuel-conducting passageway to actuate the door opener to pivot the first and second doors about the door-pivot axis.

2. The filler neck closure assembly of claim 1, wherein the overtravel means includes a first multi-directional slot formed in the first door that receives a first portion of the flexible band and a second multi-directional slot formed in the second door that receives a second portion of the flexible band.

3. The filler neck closure assembly of claim 2, wherein the first door and the second door pivot relative to the door-support ring about a single door-pivot axis.

4. The filler neck closure assembly of claim 2, wherein the door-support ring is formed to include an opening, each of the first door and the second door include a panel and an outer tab, the panels of the first and the second doors are arranged to block access through the opening in the door-support ring when the first door and the second door are in the closed position, the panels of the first and the second doors are arranged to allow access through the opening in the door-support ring when the first door and the second door are in the opened position, and the outer tabs are formed to include the first and the second multi-directional slots.

5. The filler neck closure assembly of claim 4, wherein the outer tabs are spaced apart from the opening when the first door and the second door are in the closed position and when the first door and the second door are in the opened position.

6. The filler neck closure assembly of claim 2, wherein the first multi-directional slot is L-shaped and the second multi-directional slot is L-shaped.

7. The filler neck closure assembly of claim 6, wherein the plurality of band movers are ball bearings mounted to the housing to slide relative to the housing inwardly and outwardly from a central axis about which the housing and the door-support ring extend.

8. A filler neck closure assembly associated with a vehicle fuel tank filler neck, the assembly comprising
    a nozzle inhibitor including a door-support ring that extends around an opening and a first door coupled to the door-support ring to pivot about a door-pivot axis relative to the door-support ring, the first door being mounted for movement relative to the door-support ring from a closed position arranged to block movement of a small-diameter unleaded fuel-dispensing nozzle through the opening to an opened position arranged to allow movement of a medium-diameter or large-diameter diesel fuel-dispensing nozzle through the opening, and
    a door opener including a flexible band and a plurality of band movers, the flexible band being movable from a normally contracted position to a partly-expanded position and further to a fully-expanded position, the plurality of band movers being arranged to lie in locations to push the flexible band to the partly-expanded position in response to being engaged by a medium-diameter diesel fuel-dispensing nozzle inserted into a fuel-conducting passageway and to push the flexible band to the fully-expanded position in response to being engaged by a large-diameter diesel fuel-dispensing nozzle inserted into the fuel-conducting passageway, and
    wherein the first door is formed to include a first multi-directional slot that receives a first portion of the flexible band, the first multi-directional slot is sized and located to cause the first portion of the flexible band received in the multi-directional slot to move along a first leg of the multi-directional slot to cause the first door to pivot about the door-pivot axis to the opened position in response to a medium-diameter diesel fuel-dispensing nozzle engaging the plurality of band movers and to cause the first portion of the flexible band received in the first multi-directional slot to move along the first leg of the multi-directional slot to cause the first door to pivot about the door-pivot axis to the opened position and to move along a second leg of the multi-directional slot without causing the first door to pivot further in response to a large-diameter diesel fuel-dispensing nozzle engaging the plurality of band movers.

9. The filler neck closure assembly of claim 8, wherein the first door includes a panel and an outer tab, the panel blocks access through the opening in the door-support ring when the first door is in the closed position or allows access through the opening in the door-support ring when the first door is in the closed position, and the outer tab is formed to include the multi-directional slot.

10. The filler neck closure assembly of claim 9, wherein the multidirectional slot is L-shaped and the first leg and the second leg are arranged to lie in perpendicular relation to one another.

11. The filler neck closure assembly of claim 8, wherein the first door includes a closure panel and an outer tab coupled to the closure panel, the closure panel is arranged partly to occlude the opening formed in the door-support ring when the first door is moved to assume a closed position, the outer tab is arranged to extend away from the opening formed in the door-support ring when the first door occupies the closed position and is formed to include the first and second legs of the multi-directional slot.

12. The filler neck closure assembly of claim 8, wherein the nozzle inhibitor further includes a second door coupled to the door-support ring to pivot about the door-pivot axis relative to the door-support ring and movable relative to the door-support ring from a closed position arranged to block movement of a small-diameter unleaded fuel-dispensing nozzle through the opening to an opened position arranged to allow movement of a medium-diameter or large-diameter diesel fuel-dispensing nozzle through the opening.

13. The filler neck closure assembly of claim 12, wherein the first door and the second door pivot relative to the door-support ring about a single door-pivot axis.

14. The filler neck closure assembly of claim 12, wherein the second door is formed to include a second multi-directional slot, a second portion of the flexible band is received in the second multi-directional slot to couple the flexible band to the second door, and the second multi-directional slot is sized and located to cause the second portion of the flexible band to move along a first leg of the second multi-directional slot which causes the second door to pivot about the door-pivot axis to the opened position in response to a medium-diameter diesel fuel-dispensing nozzle engaging the plurality of band movers to cause the second portion of the flexible band received in the second multi-directional slot to move along the first leg of the second multi-directional slot which causes the second door to pivot about the door-pivot axis to the opened position and moves along a second leg of the second multi-directional slot without causing the second door to pivot further in response to a large-diameter diesel fuel dispensing nozzle engaging the plurality of band movers.

15. The filler neck closure assembly of claim 8, wherein the plurality of band movers are ball bearings mounted to the housing to slide relative to the housing inwardly and outwardly from a central axis about which the housing and the door-support ring extend.

16. A filler neck closure assembly associated with a vehicle fuel tank filler neck, the assembly comprising
a nozzle inhibitor including a door-support ring formed to include an opening, a first door coupled to the door-support ring to pivot relative to the door-support ring about a door-pivot axis, and a second door coupled to the door-support ring to pivot relative to the door-support ring about the door-pivot axis, the first door and the second door being movable relative to the door-support ring from a closed position blocking access through the opening to an opened position allowing access through the opening, and
a door opener including a housing, a flexible band mounted to the housing, and a plurality of band movers mounted to the housing, the flexible band being coupled to the first and the second doors to move the first and the second doors from the closed position to the opened position when the band is moved from a contracted position to an expanded position, and the plurality of band movers being arranged to be engaged by one of a medium-diameter and a large-diameter diesel fuel-dispensing nozzle moving toward the opening formed in the door-support ring of the nozzle inhibitor and to push the flexible band from the contracted position to one of the plurality of expanded positions upon engagement of the band movers by the one of the medium-diameter and the large-diameter diesel fuel dispensing nozzle,
wherein the first door and the second door each include a panel that extends in a first direction from the door-pivot axis and an outer tab that extends in a second direction, opposite the first direction, from the door-pivot axis, the panels block access through the opening in the door-support ring when the first and the second doors are in the closed position and allow access through the opening in the door-support ring when the first door and the second door are in the opened position, and the outer tabs are each formed to include a slot that receives a corresponding portion of the flexible band.

17. The filler neck closure assembly of claim 16, wherein slots formed in the outer tabs of the first and the second doors are L-shaped such that the corresponding portion of the flexible band received in each slot moves along a first leg of the slot which causes the first and the second doors to pivot about the door-pivot axis to the opened position in response to a medium-diameter diesel fuel-dispensing nozzle engaging the plurality of band movers and to cause the corresponding portions of the flexible band received in each slot to move along the first leg of the slot which causes the first and the second doors to pivot about the door-pivot axis to the opened position and moves along a second leg of the slot which causes the first and the second doors to pivot further in response to a large-diameter diesel fuel-dispensing nozzle engaging the plurality of band movers.

18. The filler neck closure assembly of claim 16, wherein the plurality of band movers are ball bearings mounted to the housing to slide relative to the housing inwardly and outwardly from a central axis about which the housing and the door-support ring extend.

19. The filler neck closure assembly of claim 18, wherein the housing is formed to include a plurality of cylindrical chambers that receive the plurality of band movers and through which the flexible band extends.

20. The filler neck closure assembly of claim 16, wherein the nozzle inhibitor further includes a plurality of spring fingers that extend outwardly from the door-support ring away from the opening to locate the door-support ring within a chamber that receives the nozzle inhibitor.

21. A filler neck closure assembly comprising
a nozzle inhibitor formed to include a door support having a central opening sized to receive a fuel-dispensing nozzle during a tank-refueling activity, a first door mounted for movement relative to the door support about a door-pivot axis from a closed position partly occluding the central opening to an opened position opening the central opening, and a second door mounted for movement relative to the door support about the door-pivot axis from a closed position partly occluding the central opening and an opened position opening the central opening, the first and second doors cooperating to block movement of a fuel-dispensing nozzle through the central opening of the door support when each of the first and second doors is moved to assume the closed position.

22. The filler neck closure assembly of claim 21, wherein the first door is formed to include a first closure panel and a first outer tab coupled to the first closure panel, the first closure panel is arranged partly to occlude the central opening formed in the door support when the first door is moved to assume the closed position, the first outer tab is arranged to extend away from the central opening when the first door occupies the closed position, and the door-pivot axis intersects the first outer tab at a point arranged to lie in radially outwardly pace-apart relation to the central opening when the first door occupies the closed position.

23. The filler neck closure assembly of claim 22, wherein the second door is formed to include a second closure panel and a second outer tab coupled to the second closure panel, the second closure panel is arranged partly to occlude the central opening formed in the door support when the second door is moved to assume the closed position, the second outer tab is arranged to extend away from the central opening when the second door occupies the closed position, and the door-pivot axis intersects the second outer tab at a point arranged to lie in radially outwardly spaced-apart relation to the central opening when the second door occupies the closed position.

24. The filler neck closure assembly of claim 23, further comprising a door opener configured to provide means for pivoting the first and second doors about the door-pivot axis between closed positions to block passage of a fuel-dispensing nozzle through the central opening formed in the door support and opened positions to allow passage of a fuel-dispensing nozzle through the central opening formed in the door support, the door opener including a first end and a second end and lying in the path of a fuel-dispensing nozzle moving in the filler neck closure assembly toward the central opening formed in the door support, the first outer tab is formed to include a first slot, the first end of the door opener moves in the first slot in response to engagement of the fuel-dispensing nozzle and the door opener during pivotable movement of the first door between the opened and closed positions, the first slot includes a first leg and a second leg, the first end of the door opener moves back and forth in the first leg of the first slot formed in the outer tab during movement of the first door between the opened and closed positions during movement of a medium-diameter (diesel) fuel-dispensing nozzle in the filler neck closure assembly toward the central opening while in engagement with the door opener to cause the first door to move relative to the door support to the opened position, and the first end of the door opener moves from the first leg of the first slot formed in the first outer tab into the second leg of the first slot only during movement of a relatively larger larger-diameter (diesel) fuel-dispensing nozzle in the filler neck closure assembly toward the central opening while in engagement with the door opener to establish a lost-motion driving connection between the first end of the door opener and the first outer tab of the first door to allow overtravel movement of the first end of the door opener in the second leg of the first slot without moving the first door relative to the door support away from the opened position.

25. The filler neck closure assembly of claim 24, wherein the second door is formed to include a second closure panel and a second outer tab coupled to the second closure panel, the second closure panel is arranged partly to occlude the central opening formed in the door support when the second door is moved to assume the closed position, the second outer tab is formed to include a second slot, the second end of the door opener moves in the second slot in response to engagement of the fuel-dispensing nozzle and the door opener during pivotable movement of the second door between the opened and closed positions, the second slot includes a first leg and a second leg, the second end of the door opener moves back and forth in the first leg of the second slot formed in the second outer tab during movement of the second door between the opened and closed positions during movement of a medium-diameter (diesel) fuel-dispensing nozzle in the filler neck closure assembly toward the central opening while in engagement with the door opener to cause the second door to move relative to the door support to the opened position, and the first end of the door opener moves from the first leg of the second slot formed in the second outer tab into the second leg of the second slot only during movement of a relatively larger larger-diameter (diesel) fuel-dispensing nozzle in the filler neck closure assembly toward the central opening while in engagement with the door opener to establish a lost-motion driving connection between the first end of the door opener and the second outer tab of the second door to allow overtravel movement of the second end of the door opener in the second leg of the second slot without moving the second door relative to the door support away from the opened position.

26. The filler neck closure assembly of claim 21, wherein the door support is ring-shaped.

* * * * *